(12) United States Patent
Olson

(10) Patent No.: US 6,779,983 B1
(45) Date of Patent: Aug. 24, 2004

(54) SLUDGE PUMP WITH MANAGEMENT SYSTEM

(76) Inventor: David A. Olson, 1708 Roberts Dr., Albert Lea, MN (US) 56007

( * ) Notice: Subject to any disclaimer, the term of this patent is extended or adjusted under 35 U.S.C. 154(b) by 0 days.

(21) Appl. No.: 10/265,055

(22) Filed: Oct. 4, 2002

Related U.S. Application Data

(60) Provisional application No. 60/327,442, filed on Oct. 5, 2001.

(51) Int. Cl.[7] ............................................... F04B 15/02
(52) U.S. Cl. ........................ 417/53; 417/900; 417/347; 73/239
(58) Field of Search ................................ 417/53, 63, 4, 417/12, 900, 317, 342, 347; 73/3, 239

(56) References Cited

U.S. PATENT DOCUMENTS

| | | | |
|---|---|---|---|
| 5,222,872 A | * 6/1993 | Marian et al. | ............... 417/344 |
| 5,257,912 A | 11/1993 | Oakley et al. | |
| 5,336,052 A | * 8/1994 | Zollner et al. | ................ 417/20 |
| 5,336,055 A | 8/1994 | Anderson | |
| 5,346,368 A | * 9/1994 | Oakley et al. | ................ 417/63 |
| 5,388,965 A | * 2/1995 | Fehn | ........................... 417/63 |
| 5,401,140 A | * 3/1995 | Anderson | .................... 417/63 |
| RE35,473 E | 3/1997 | Oakley et al. | |
| 5,839,883 A | * 11/1998 | Schmidt et al. | ................ 417/63 |

* cited by examiner

Primary Examiner—Justine R. Yu
Assistant Examiner—Han L Liu
(74) Attorney, Agent, or Firm—Gray Plant Mooty Mooty and Bennett, P.A.; Robert W. Gutenkauf

(57) ABSTRACT

A viscous material (sludge) pump, a method of accurately estimating output of such a pump and a method of efficiently managing such a pump. The pump can be the single or double cylinder variety. The pump is calibrated to determine a calibrated sludge-weight output of the pump in terms of a parameter defined as a "lost travel" position of the piston in the pump chamber. This position is defined in terms of the position of the piston in the chamber when the pressure in the chamber reaches a preselected reference pressure expressed in terms of a percentage of the maximum pressure reached in the chamber during a just previous discharge stroke of the piston. The lost travel parameter is used for comparison purposes to accurately estimate actual pump output based on the calibrated pump output at the calibrated value of the lost travel parameter. The pump is managed efficiently by management of the speed of the feed auger. This assures that an approximately optimal amount of material is loaded into the pumping chamber each pumping cycle. The pump is also managed by management of the pump stroke distance and speed.

21 Claims, 6 Drawing Sheets

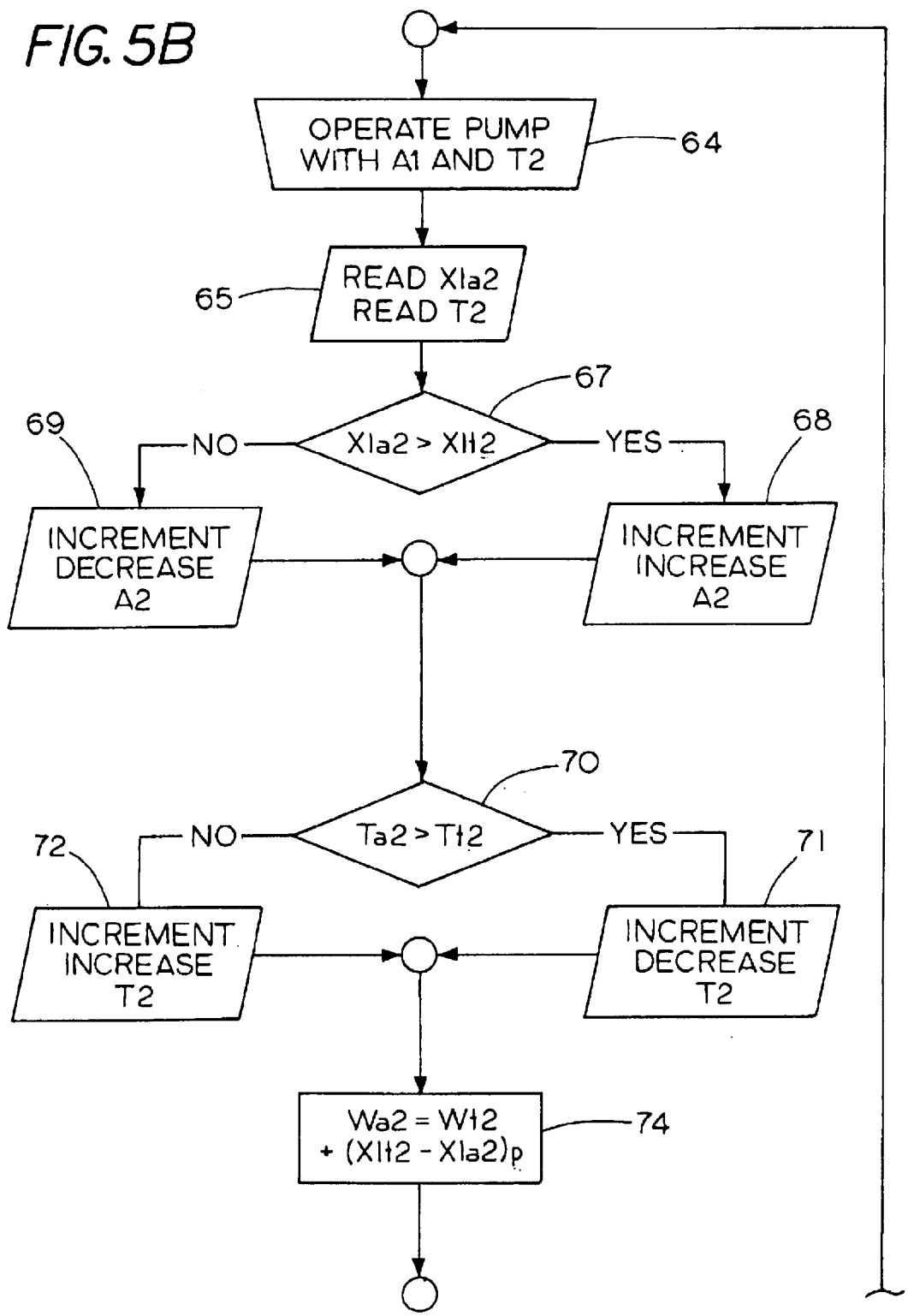

SLUDGE PUMP WITH MANAGEMENT SYSTEM

CROSS REFERENCE TO RELATED APPLICATION

This application claims the benefit of U.S. Provisional Application Ser. No. 60/327,442 filed Oct. 5, 2001 entitled Sludge Pump With Management System.

BACKGROUND OF THE INVENTION

A sludge pump handles sludge which is a variable mixture of solids and fluids with some amount of entrained air. A typical positive displacement sludge pump has one or two pumping cylinders. A material pumping piston reciprocates in the chamber of the pumping cylinder, typically hydraulically powered. Sludge material is introduced into the pumping chamber through an inlet valve. The material is derived from a supply source and is fed into the cylinder by a feed mechanism which is typically an auger system.

During a pump cycle, the pumping piston alternately moves rearward through a fill stroke and forward through a power or discharge stroke. During the fill stroke, the piston retracts. As it does so, the pumping chamber fills with sludge. Upon the discharge stroke the pumping piston advances in the pumping chamber. As it does, it moves sludge out through an outlet valve. In the case of a double cylinder pump, while the piston in one cylinder advances, the other is retracting. The pistons are usually hydraulically linked so that they move together.

The sludge is comprised of solids, liquids and some amount of air. In addition, during the fill stroke, the pumping chamber does not completely fill. Because of these two factors, when the piston first advances in the pumping chamber upon commencement of the discharge stroke, it encounters little or no load. It does not encounter load until it has traveled through any empty or unfilled space in the chamber ahead of it, and until there has been some initial compression of the material in the chamber. During this "lost travel" segment of the piston stroke, the piston does no significant work. Management of this segment of the pump stroke increases pump efficiency.

Sludge pumps find use in waste treatment plants using incinerators to dispose of waste. The sludge pump feeds waste material to the incinerator. Government regulations require record keeping of the volume of waste incinerated. In a prior art sludge pump, the volume of waste pumped is measured by measuring the percent fill of the pumping chamber of the pump on each stroke and accumulating the measurements. This gives a measurement of the actual volume of sludge pumped. For example, see U.S. Pat. No. 5,346,368.

A sludge pump of the type having ball and cage inlet and outlet valves has been found particularly useful in pumping installations. However, the "percent fill" method of determining volumetric output does not work well with such pumps. There is no reliable determination of when the outlet valve opens during the forward stroke of the pumping piston. A need exists for a method of making a reliable volumetric determination of output for such pumps.

SUMMARY OF THE INVENTION

A viscous material (sludge) pump, a method of accurately estimating output of such a pump and a method of efficiently managing such a pump.

The pump can be the single or double cylinder variety. A double cylinder pump is disclosed. Those skilled in the art will readily see how the invention is applicable to a single cylinder pump. The invention is particularly applicable to a pump of the type having a ball and cage type outlet valve from the pump chamber.

Accurately estimating the output of the pump involves a calibration of the pump to determine a calibrated sludge-weight output of the pump in terms of a parameter defined as a "lost travel" position of the piston in the pump chamber. This position is defined in terms of the position of the piston in the chamber when the pressure in the chamber reaches a preselected reference pressure. The preselected reference pressure can be expressed in terms of a percentage of the maximum pressure reached in the chamber during a just previous discharge stroke of the piston.

The pump is managed efficiently by management of the speed of the feed auger (or other feed mechanism). This assures that an approximately optimal amount of material is loaded into the pumping chamber each pumping cycle.

Pumping volume is managed in part by management of the pump stroke. Pump stroke can be managed in terms of stroke distance and stroke time. In terms of stroke distance, shift points are programmed (inputted) into the computer managing the pump. The cylinder chamber is equipped with a linear transducer assembly which is able to report piston position in the cylinder virtually instantaneously. A rear shift point and a forward shift point are inputted. The pump piston changes direction at the shift points.

Upon commencement of a discharge stroke, the piston advances a distance along the axis of the cylinder chamber before it encounters a significant load. When loading is encountered the event is manifested as a significant pressure increase in the cylinder as well as by a significant increase in the hydraulic pressure driving the piston. A "lost travel" reference location is defined as the point along the pump cylinder axis where the piston encounters a load that is predefined in terms of pressure in the pump chamber, and begins doing some amount of work. For purposes of the present invention, the lost travel reference point is defined in terms of the position of the pump piston (measured along an "x" axis coincidental with the axis of the pumping chamber) when the pumping chamber pressure reaches a preselected reference pressure. This reference pressure is expressed in terms of a percentage of the maximum pressure reached on a just previous discharge stroke. In a preferred embodiment, 50% is selected as that percentage. The maximum pressure of the previous stroke was recorded. Upon forward movement of the piston during the next stroke, pressure builds from a relatively low value toward a maximum pressure that will predictably be in the vicinity of the last maximum pressure. When the cylinder pressure reaches 50% of the maximum pressure recorded for the previous stroke, the x-axis piston position at that point is defined as the "lost travel" position of the piston for that stroke.

The "lost travel" position point is determined in terms of the location of the piston when the cylinder pressure reaches a selected percentage of the maximum pressure of the previous stroke. This is done for purposes of comparison of that position with the previous lost travel position, the target one and/or the calibrated one. The selected percentage could be more or less than 50%. Fifty percent is chosen because the maximum pressure during a stroke will generally be at least 50% of the maximum pressure of the previous stroke. This assures that a lost travel position will be determined during the stroke. When the cylinder pressure during a power stroke reaches 50%, the pressure gradient in the cylinder is high, whereby the lost travel reference point is well defined.

In managing the pump, a desired or target lost travel value is inputted to the pump. Following a start-up period, during operation of the pump on a discharge stroke of the piston (1) the maximum pressure in the cylinder chamber during the stroke is measured and (2) the lost travel position of the piston is recorded. The lost travel position of the pump piston is that location of the piston where the chamber pressure is 50% of the maximum pressure reached during the previous discharge stroke of the pump piston. The processor compares the recorded or actual lost travel with the target lost travel. If it is larger (i.e. further down the axis of the pumping chamber), this indicates that too little material was introduced into the cylinder during the previous fill. The processor generates a signal to incrementally increase the auger speed for the next fill cycle of the pump piston. Increasing the auger speed causes introduction of more material into the pumping chamber on the next cycle, tending to move the next lost travel point rearward in the cylinder toward the target lost travel point. On the other hand, if the processor finds that the actual lost travel is less than the target lost travel (rearward in the pumping chamber of the target lost travel point), this indicates that too much material was introduced into the chamber during the last fill. Accordingly, the processor generates a signal to decrease auger speed. This results in less material being introduced into the pump chamber on the next stroke, tending to move the next lost travel point forward and toward the target lost travel point. The auger is operated only at a speed that will tend to fill the pumping chamber the desired amount. This saves on auger operation and maintenance, and helps maintain consistency of the material pumped. In addition, it leads to maintenance of a consistent volumetric pumping rate.

The pump can be further managed by managing forward stroke time of the pump piston. Stroke time is determined by piston speed, a controllable parameter. A desired or target stroke time can be input along with the desired lost travel. This effectively inputs a target volumetric output rate for the pump. Upon a forward stroke of the pump, the stroke time is measured. The processor compares actual stroke time with the target stroke time. If actual stroke time is greater, the processor generates a signal to speed the piston. If it is less, the processor generates a signal to slow the piston.

The invention includes a calibration of the pump for the purpose of managing and statistically determining pumping volume. A lost travel value is inputted to the processor. Calibration is accomplished by pumping material through the pump for a measured period of time. The number of strokes is recorded. Lost travel for each stroke is recorded. The total output of the pump for the measured amount of time is weighed. This total weight is divided by the number of strokes to give a statistical average of the output per stroke. The calibration gives an average or calibrated lost travel; average or calibrated output per stroke; and calibrated time per stoke (pump speed). In addition, the calibration yields a parameter of pounds-per-unit-inch, which is the weight of compacted material in the pumping chamber in one linear inch along the chamber axis, or the "linear density" of the material.

Actual pumping volume of the pump during working conditions is accurately estimated and reported through use of the calibration. The operator inputs the desired volumetric output of the pump in terms of either rate (tons/hour) or actual quantity of material (tons). The pump pumps the inputted value by management of the lost travel position of the pump ram piston. This is accomplished by management of speed of the material feed system which is, in the case of a preferred embodiment, an auger system. The pump has a calibrated lost travel value. The operator inputs volumetric requirement by inputting a target lost travel value. The computer uses the linear density calibration to adjust the calibrated lost travel value to the target lost travel value. Volumetric output of the pump is reported according to a volume estimated using the target lost travel value, with an adjustment according to pump deviation from the target lost travel value. The adjustment is calculated for each stroke, taking into account the deviation of the lost travel from the target lost travel, and using the linear density calibration to calculate the adjustment.

IN THE DRAWINGS

FIGS. 5A through 5C are together a flow diagram according to one embodiment of the management system of the present invention.

DESCRIPTION OF A PREFERRED EMBODIMENT

Figure 1:
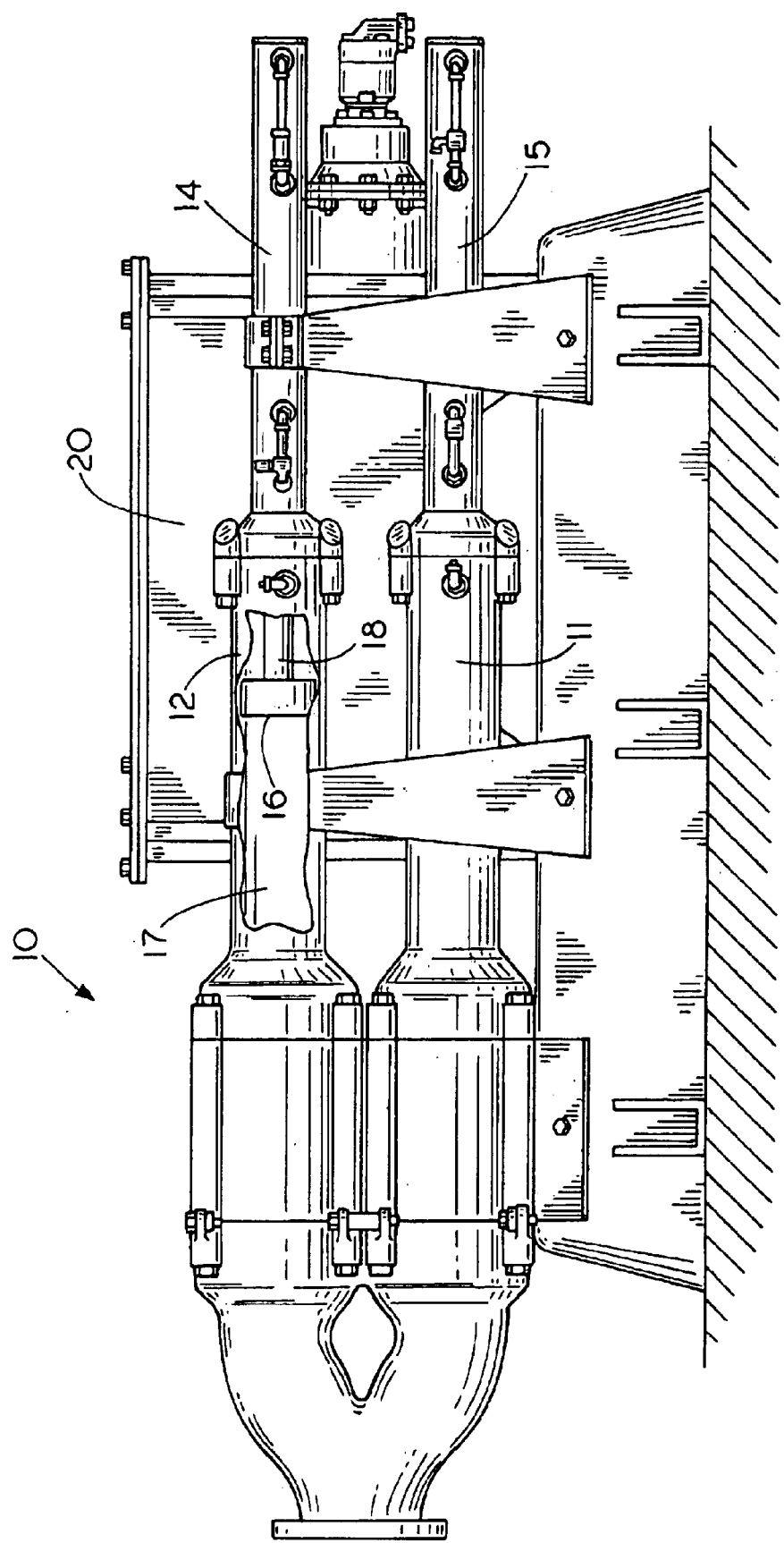
FIG. 1 is a side elevational view of a sludge pump having a management system according to the present invention, with wall portions broken away for purposes of illustration.

FIG. 1 shows a sludge pump indicated generally at 10 and including a pump management system according to the present invention. The pump has a lower pumping cylinder 11 and an upper pumping cylinder 12 which are alike in construction. Each cylinder contains a material moving ram or piston powered by an hydraulic actuator or motor of the piston-cylinder type. The hydraulic actuators are indicated at 14 and 15. The pistons in the cylinders move out of phase from one another. The pistons shift simultaneously. In FIG. 1 a material moving piston 16 is shown in the cylinder chamber 17 of the upper pumping chamber 12 and mounted on a shaft 18. The other end of shaft 18 is connected to the piston of the upper hydraulic actuator 14. Movement of piston 16 is controlled by flow of hydraulic fluid in and out of the hydraulic fittings 38, 39 (FIG. 2) of actuator 14.

Figure 2:
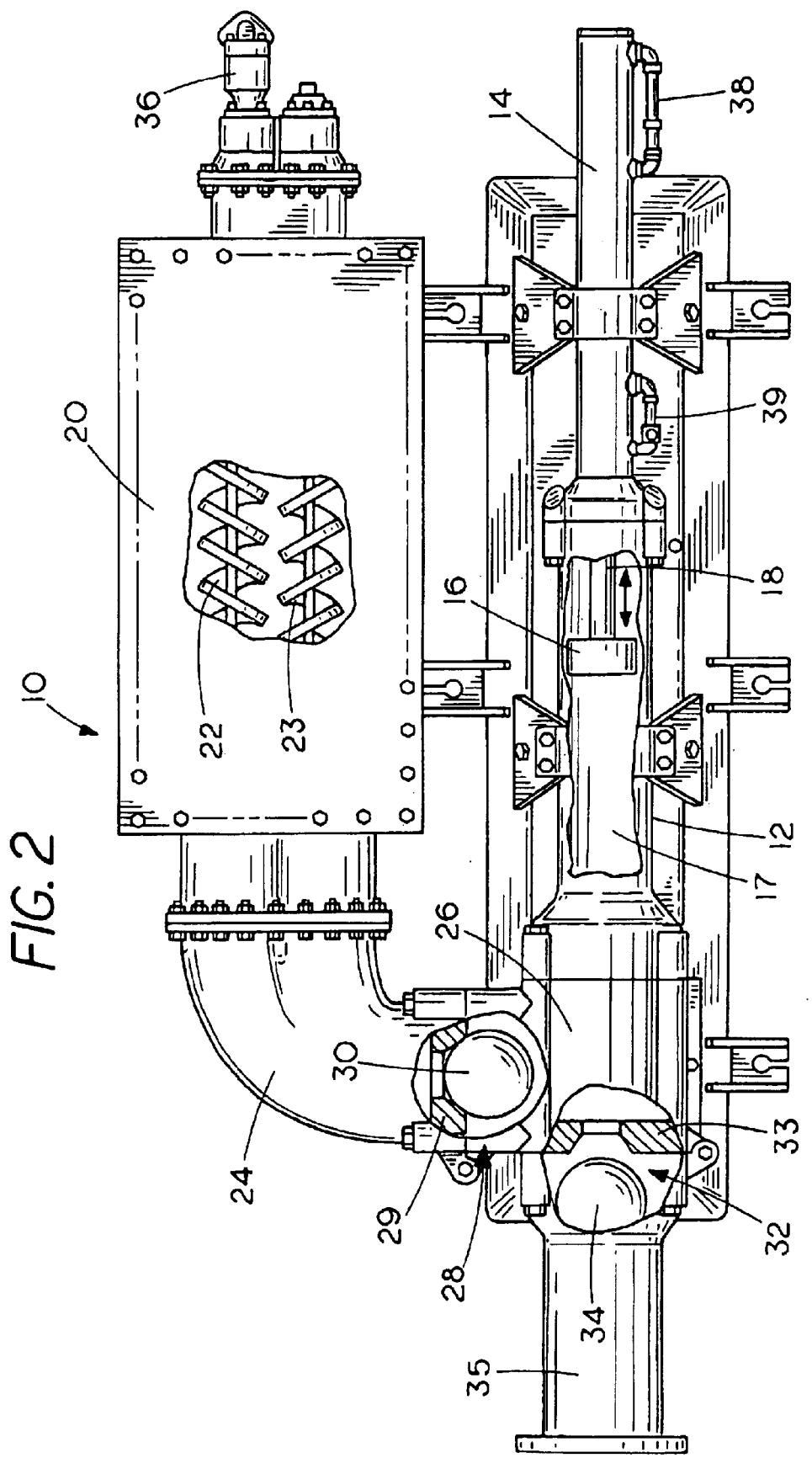
FIG. 2 is a top plan view of the pump of FIG. 1 again with wall portions broken away for purposes of illustration.

Referring to FIG. 2, a sludge receptacle includes a bin or hopper 20. Hopper 20 can receive a continuous supply of material from various means such as a conveyor belt or a storage silo. A feed mechanism shown as an auger assembly includes a pair of counter rotating augers 22, 23 located in hopper 20. A transition housing 24 connects the hopper 20 to an inlet region or valve chamber 26 of the pump housing.

Each of the pump cylinders has associated with it an inlet valve and an outlet valve. The following description pertains to the upper cylinder 12. An inlet valve 28 is located between the transition housing 24 and the valve chamber 26. The inlet valve 28 is the ball and cage variety, having a seat 29 and a ball 30. When the ball 30 engages the seat 29, the valve is closed. Sludge material coming through the transition 24 moves the ball away from the valve seat 29 to open the valve and permit passage of sludge. On the other hand, sludge moving the other direction tends to move the ball 30 into engagement with the valve seat 29 to close the valve.

A ball and cage outlet valve 32 is located between a discharge pipe 35 and the valve housing 26. Outlet valve 32 includes a valve seat 33 and a ball 34. Sludge material moving out of the valve chamber 26 passes through the outlet valve 32. The outlet valve opens responsive to the pressure of sludge moving against it during the discharge stroke of the piston. Upon the fill stroke of the piston 16, which opens inlet valve 28 and draws material into the cylinder chamber 17, the outlet valve closes. It is closed by the low pressure created by the retracting piston and by the sludge flowing from the transition into the cylinder chamber 17.

In normal use of the pump 10, sludge is continuously loaded into the hopper 20. The auger assembly includes a variable speed control auger motor 36 which drives the augers 22, 23 to move sludge into the transition chamber 24 and then past the inlet valve 28. The sludge moves into the valve chamber 26 and into the cylinder chamber 17 as the piston 16 retracts therein. The amount of sludge that is loaded into the cylinder chamber can be controlled by the auger speed, a controllable variable. Increasing auger speed increases the amount of sludge loaded into the chamber per unit of time.

On a fill stroke the piston retracts in the chamber 17 to a preset reward shift position. There it reverses direction and begins to advance on a discharge stroke. The inlet valve 28 closes and at some point the outlet valve 32 opens. Sludge material is moved out of the chamber 17 through the outlet valve 32. The piston advances until it reaches a forward shift point. The stroke length is the distance between the shift points.

The hydraulic actuator 14 controls the speed that the piston advances in the chamber and, accordingly, the forward stroke time. Speed is measured either in seconds or in cycles per unit of time. It is a controllable variable.

Figure 3:
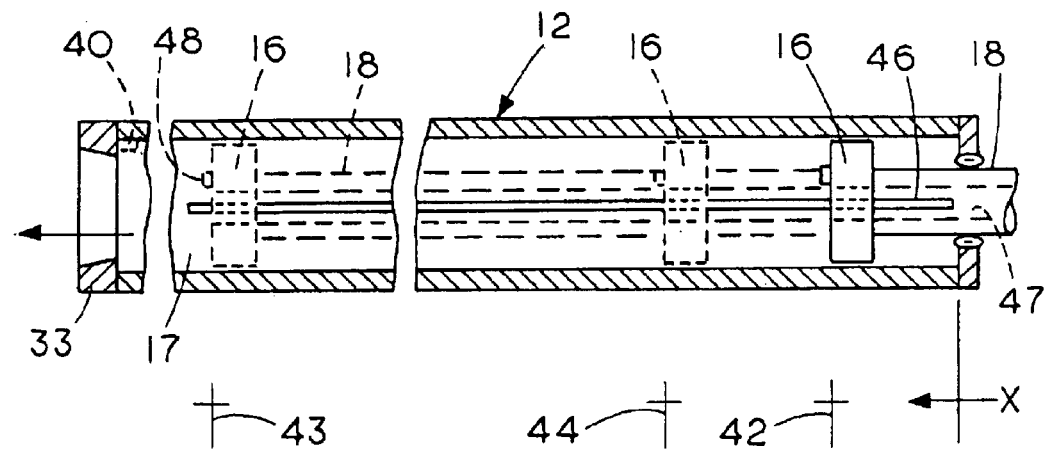
FIG. 3 is a schematic diagram of one of the pumping cylinders of the pump of FIGS. 1 and 2.

A pressure transducer indicated at 40 in FIG. 3, is located in chamber 17 for instantaneous pressure measurement output.

The sludge that is introduced into the pumping chamber 17 is compressible having a certain solids content and a certain amount of entrained air. In addition, the amount of sludge introduced into the chamber 17 will not necessarily fill the chamber ahead of the piston 16. Upon initiation of forward travel of the piston in chamber 17, the piston travels first through unoccupied space, then through a distance where it initially compresses the sludge in the cylinder chamber. The piston does little or no work during this initial travel segment in the chamber. This initial travel segment is termed herein as "lost travel."

The cylinder 12 is illustrated schematically in FIG. 3. A "x-axis" is shown coincidental with the cylinder axis. A rearward shift point is indicated at 42 which is also shown to be the full line position of piston 16. A forward shift point is indicated at 43, where piston 16 is shown in phantom. The rearward and forward shift points are spaced in by a safe distance from the cylinder end walls to avoid damage. A lost travel position of piston 16 is indicated at 44 on the x-axis.

The instantaneous position of the piston along the cylinder axis can be determined. The particular instrumentation shown in FIG. 3 includes a linear transducer having a rod 46 mounted centrally in the chamber 17 along the x-axis. Piston 16 and piston shaft 18 have a central bore 47. Rod 46 extends through bore 47. A magnetic pickup device 48 is attached to piston 16. Pickup 48 reports the position of piston 16 via rod 46. Other suitable instrumentation could be used to track the position of piston 16 in cylinder 12.

Figure 4:
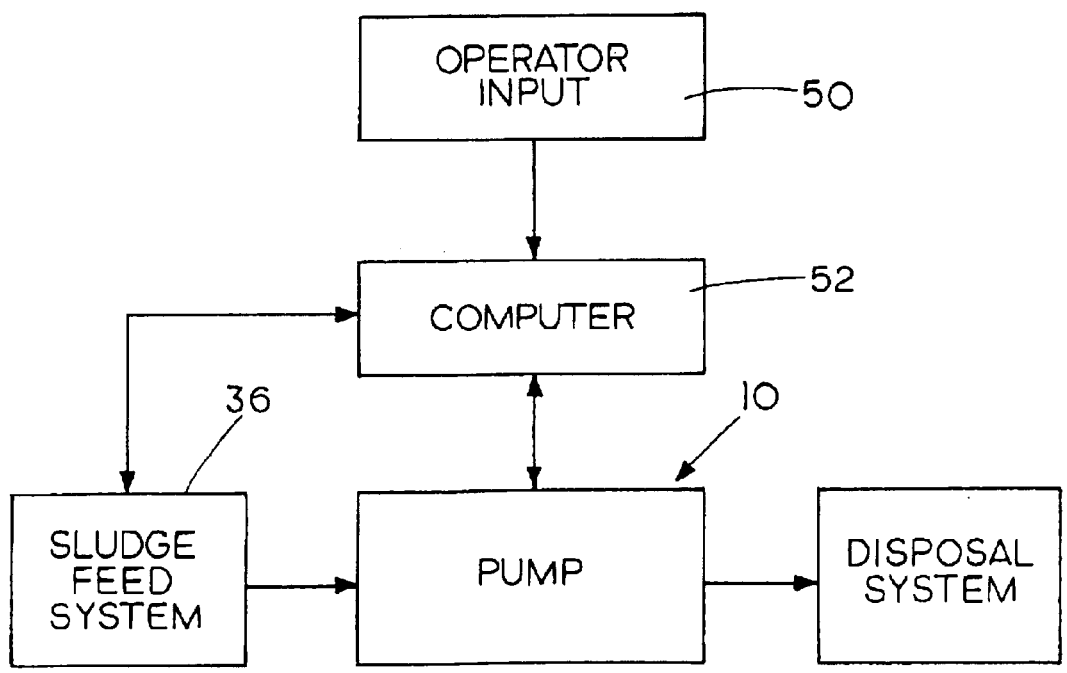
FIG. 4 is a block diagram generally depicting the interrelationship of the computer and the pump.

The diagram of FIG. 4 illustrates the relationship between the operator, the computer and the pump. Appropriate input devices 50 permit operator input into the computer 52. Computer memory or processor has stored in it or has inputted into it certain initialized values, for example, calibrated values as will be discussed. The computer inputs initial or starting values to certain pump controls, such as an initial auger speed. The computer reads back the pump speed, the stroke time, the shift points, the lost travel position and the auger speed.

As part of the method of the present invention the pump is calibrated prior to normal usage. The pump is calibrated for pumping volume (or weight) and pumping rate (volume or weight per unit of time). The calibration yields calibrated values that are used to accurately estimate the output of the pump during regular operation.

The variables involved are auger speed (A); x-axis piston position (X); lost travel x-axis piston position (Xl); x-axis forward shift point (Xsf); x-axis rear shift point (Xsr); pressure in the chamber (P); piston speed in terms of frequency (cycles per unit time) (Y); piston speed in terms of time measured from the commencement of the forward or discharge stroke (T); and sludge weight per cycle (Wc). The more reoccurring subscripts to the variables used herein are: c=calibrated; t=target (or desired); a=actual; 1=upper or first cylinder; and 2=lower or second cylinder.

The "lost travel" position of a piston during a particular stroke (Xl) is defined as the x-axis position of the piston when the pressure P in the cylinder reaches a preselected value in terms of a reference percentage of the maximum pressure reached in the pump chamber during a just previous discharge stroke. In a preferred embodiment, the reference pressure is 50% of the maximum pressure (Pm) that was reached during the previous stroke. During the forward stroke of the piston, the pressure in the chamber begins at a low value as the piston travels first through empty space. When the piston encounters the sludge in the piston chamber, pressure builds as the piston advances and the material is compressed. Toward the end of the stroke, pressure reaches a maximum value, which is recorded. During the next forward stroke of the piston, the lost travel position of the piston is the x-axis location of the piston when the pressure in the cylinder reaches 50% of the maximum pressure as recorded the previous stroke. The location will vary depending upon the extent that the cylinder chamber is filled, which is a function of the auger speed.

Defining the lost travel location in such a manner is a matter of convenience. The purpose of defining a lost travel location is for comparison purposes. Comparison of the lost travel position of a pump stroke with that of the calibrated pump stroke enables an accurate estimate of the volume pumped during the stroke. The percent value chosen could be other than 50%. For example the reference percentage could be 30% or 70%. The 50% value is selected since it is relatively certain that, on any stroke, the maximum pressure reached will be at least 50% of that of the previous stroke. In addition, at the 50% pressure level, the pressure gradient is high whereby a relatively precise location on the x-axis will be identified.

The forward shift point of a piston in a cylinder (Xsf) is the x-axis location of the piston where it reverses direction at the front end of the cylinder. The rearward shift point of a piston (Xsr) in a cylinder is the x-axis location of the piston where it reverses direction at the rearward end of the cylinder. These are normally the same for both cylinders.

Pump Calibration

The object of calibrating the pump is to obtain calibrated values for lost travel and stroke time correlated to actual volumes pumped, which values are later used to statistically calculate pump output. In the calibration procedure, the operator inputs lost travel starting values for both the top and bottom cylinders of the two cylinder pump. The operator inputs forward and rear piston shift points (Xsf, Xsr). The operator also inputs auger speed. The input auger speed, like the lost travel values, can be different for the top and bottom cylinders, but for purposes of calibration will usually be the same. The pump is operated to pump sludge. Auger speed is adjusted as needed in order to fill the pump chamber to approximately the lost travel position of the piston in both cylinders.

Following a start-up period, the pump output is collected for a measured duration of time. During this time, strokes, stroke time and lost travel position are recorded. At the end of the period, the total pump output of sludge is weighed on a scale.

Calculations are made of the average weight of sludge pumped per cycle (Wc), the average time period of each forward stroke (Tc1, Tc2), and the average lost travel position for the accumulated strokes for both cylinders (Xlc1, Xlc2). These become calibrated values for the pump which will be used to accurately estimate and report future volumetric output of the pump. The calibration yields another parameter, which is the weight of the sludge per linear inch in the cylinder, or the linear density (pounds/inch) ($\rho$). This becomes a constant for use in future calculations of pumping output.

Pump Operation

Figure 5A:
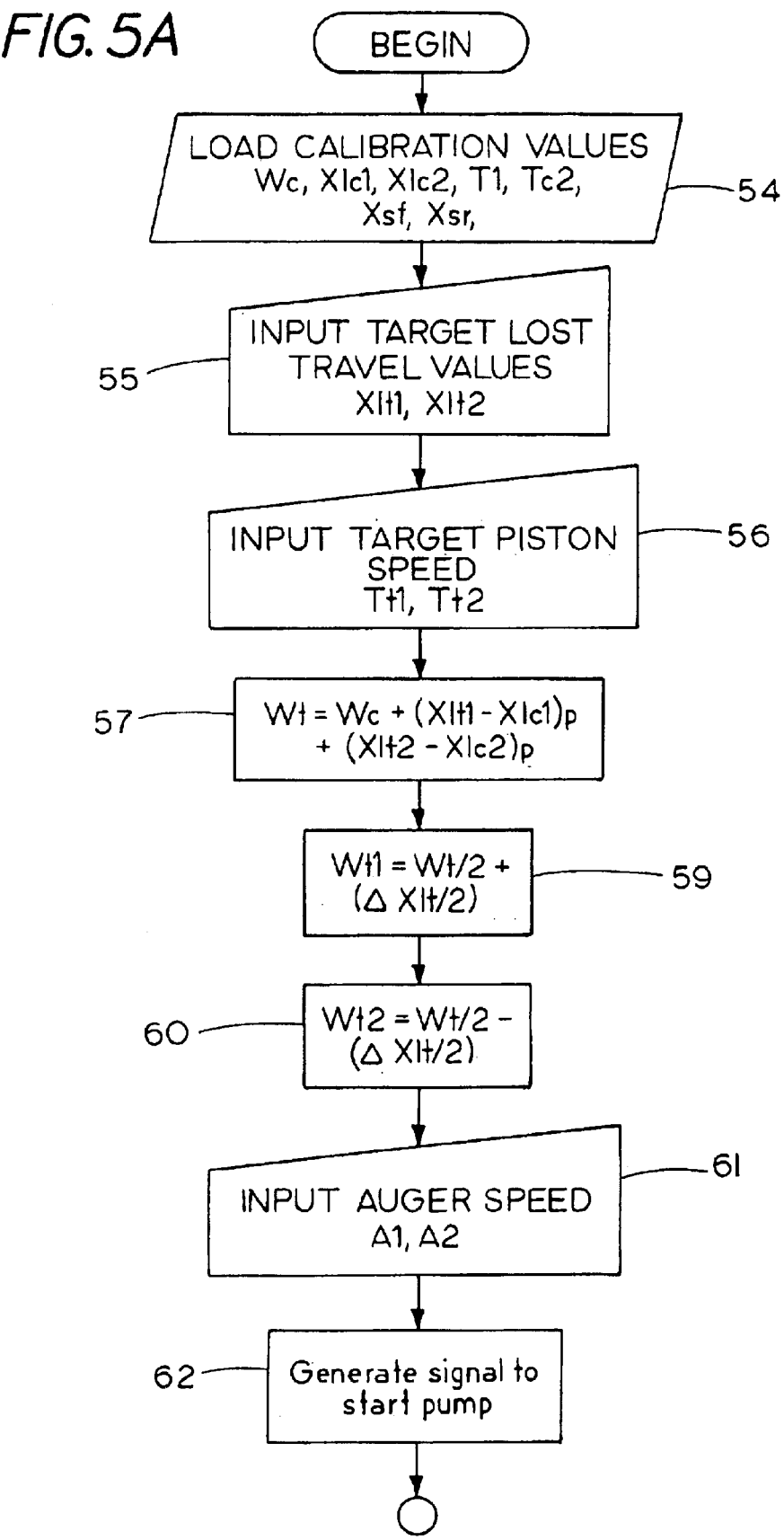
Figure 5C:
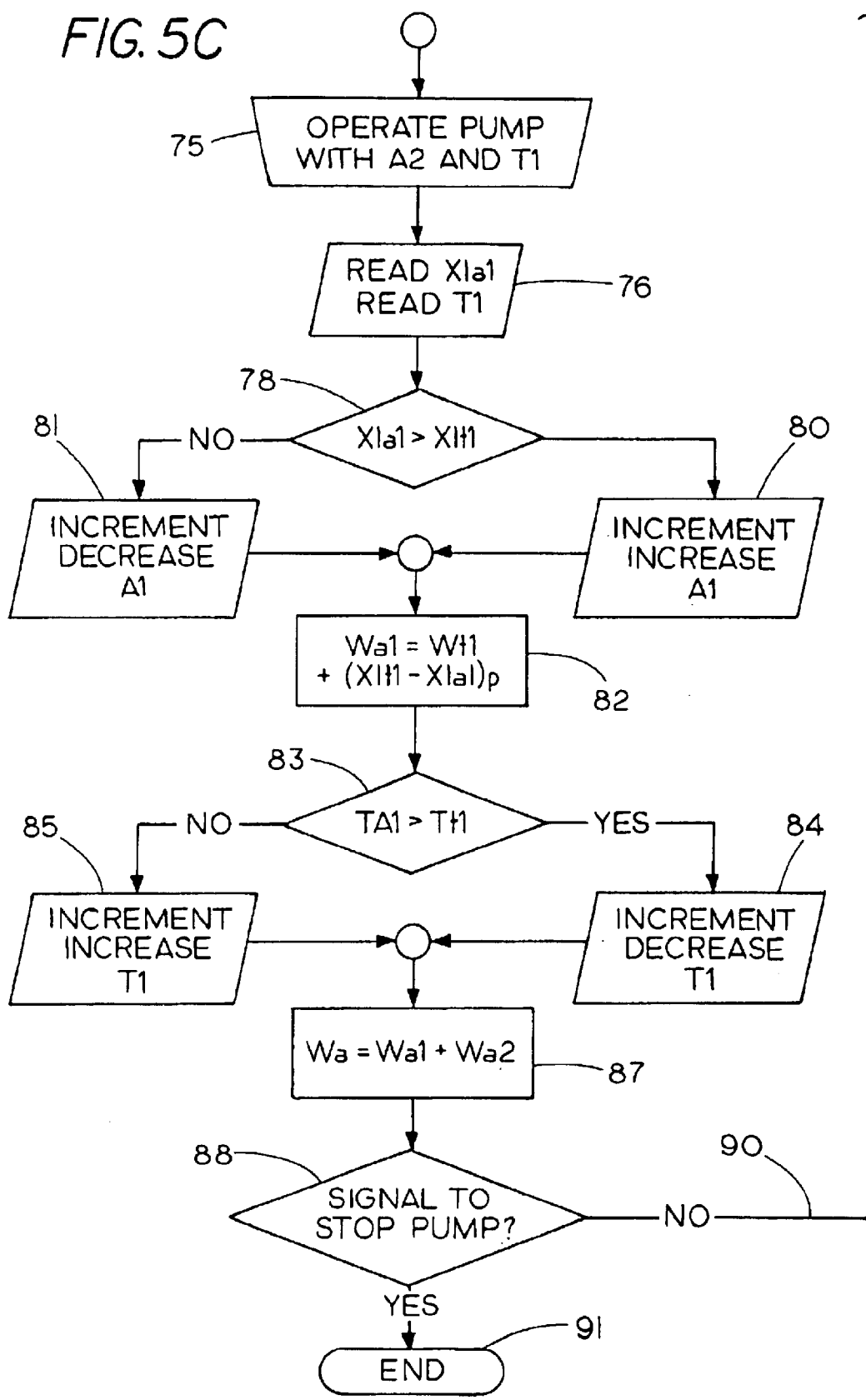

Operation of the calibrated, two cylinder pump is diagrammatically depicted in FIGS. 5A through 5C. Upon startup, calibration values are loaded into the computer processor and/or memory (at 54 in FIG. 5A). These include calibrated lost travel positions for the upper and lower cylinders (Xlc1, Xlc2); the calibrated weight of sludge per cycle (Wc); the forward stroke piston speed for each cylinder, in terms of stroke time (Tc1, Tc2); and the linear density ($\rho$).

The pump operator may want a desired target weight output per cycle (Wt) from the pump that differs from the calibrated weight output (Wc). The operator inputs the target weight (Wt), either directly or by inputting lost travel target positions for both cylinders (Xlt1, Xlt2) (55 in FIG. 5A). For reporting purposes, the computer must make an adjustment between Wc and Wt. This is done by application of the linear density calibration ($\rho$), to the difference between the calibrated lost travel values and the target lost travel values. In addition, the operator may want to input a volume rate or mass flow rate in terms of tons per hour or the like. The rate can be inputted by specifying target stroke period or time as well as target lost travel values. Accordingly, the operator can typically input Xlt1, Xlt2, Tt1 and Tt2 (56).

The computer derives a target weight output (Wt) by making an adjustment to the calibrated weight output (Wc) according to the target lost travel input (57). By inputting target lost travel values (Xlt1, Xlt2) the operator is effectively inputting a target weight output. The calibrated weight output (Wc) is the sum of the weight output of the two cylinders with the calibrated lost travel values (Xlc1, Xlc2). To obtain the value of Wt, the computer must adjust Wc according to the differences between the calibrated and target lost travel values. This difference multiplied by the linear density $\rho$ provides a weight deviation between Wc and Wt. The relation can be expressed (57 in FIG. 5A):

$$Wt=Wc+(Xlt1-Xlc1)\rho+(Xlt2-Xlc2)\rho.$$

The top and bottom cylinder parameters may or may not be equal. For example, the cylinders can output to different destinations with different volume criteria. In such a case the target lost travel values for the upper and lower cylinders would not be equal. Accordingly, the computer would need to calculate a weight adjustment to be applied to each cylinder, based upon the calculated Wt and the target lost travel differences between the two cylinders. (If the target lost travel for the two cylinders is equal, the adjusted weight output for each will simply be Wt/2.) The cylinder having the larger target lost travel value will be expected to pump a lesser volume since the cylinder will fill less during the fill stroke. The sum of the top cylinder target weight per cycle (Wt1) and the bottom cylinder target weight per cycle (Wt2) has to equal the total target weight pumped per cycle, or Wt1+Wt2=Wt. A proportionate adjustment is made by calculating the difference between the upper and lower cylinder lost travel values (Xlt2−Xlt1=$\Delta$Xlt), and applying the linear density constant to arrive at a weight differential (($\Delta$Xlt)$\rho$) between the top and bottom cylinders. One-half of this differential is applied to each cylinder to arrive at a target weight per cycle of the cylinder (59, 60 in FIG. 5A) so that:

$$Wt1=Wt/2+(\Delta Xlt/2)\rho \qquad (59) \text{ and}$$
$$Wt2=Wt/2-(\Delta Xlt/2)\rho \qquad (60).$$

Equivalent methods of making the adjustment calculations could be used. The computer calculates the calibration—target adjustment before the commencement of pumping or during each stroke, the former being more efficient. The diagram of FIG. 5A shows the calculations being made before pumping commences.

Following inputting initial values including auger speed values (61), the operator generates a signal to start pumping (62). There normally will be a start-up sequence of pumping while the cylinders load and work up to a routine pumping regimen. During routine pumping the computer continuously adjusts the pumping parameters in order to maintain uniform pumping. The computer attempts to maintain pumping in each cylinder using the target lost travel value. The computer compares actual lost travel with target lost travel and adjusts auger speed in order to match actual lost travel with target lost travel. If the actual lost travel position is less than the target lost travel, this indicates that the piston encountered sludge in the pump cylinder at a position on the x-axis rearward of the target location. To much sludge was loaded into the cylinder during the previous fill cycle of the cylinder. This indicates that the auger speed should be decreased whereby less material will be introduced into the cylinder chamber. On the other hand, if the actual lost travel value is greater than the target, i.e. further down the x-axis, then too little material was introduced during the previous fill cycle. This indicates that the auger speed should be increased during the next fill cycle. It can be seen that auger speed is used as a control for volumetric output of the pump.

Referring to FIG. 53, the pump commences pumping with the bottom piston moving forward on a discharge stroke, and the top piston retracting on a fill stroke (64). The bottom piston advances with an inputted initial control speed. The auger system fills the top cylinder chamber at an initial auger speed. During the discharge stroke, the pressure in the bottom cylinder (Pm2) is monitored and the maximum pressure reached is recorded. The x-axis position of the lower cylinder piston is noted at the instant the pressure in the cylinder chamber reaches 50% of the maximum pressure recorded during the previous stroke. This is recorded as the actual lost travel (Xla2) for the lower cylinder piston for that stroke.

At the end of the stroke the computer reads the actual lost travel value (Xla2) and the piston speed (Ta2) (65) and makes the comparisons shown in FIG. 5B (67). The computer compares the actual lost travel (Xla2) with the target lost travel value (Xlt2). If Xla2>Xlt2, then the computer generates a signal to increase the auger speed (A2) (68) for the next fill stroke of the bottom cylinder. This causes more material to be moved into the cylinder chamber during the next fill stroke. If Xla2<Xlt2 (69), then the computer generates a signal that will decrease the auger speed on the next fill stroke of the cylinder. This will result in less material being introduced into the chamber during the next fill stroke. In either case, the actual lost travel point is moved toward the target lost travel point.

The auger speed is increased and decreased incrementally. The computer can be programmed so that the size of the increment is proportionate to the deviation of the actual lost travel from the target lost travel.

At the end of the stroke, the computer also compares the actual piston speed with the target (70). If it is too fast (Ta2 is greater than Tt2) then piston speed is slowed, indicated at 71 as a decrease in stroke time. If it is too slow, the piston speed is increased (72).

At the end of the stroke, the actual weight Wa2 of material pumped by that stroke is calculated by the computer. This can be done by adjusting the target weight Wt2 according to the difference between the target lost travel position on the x-axis, and the actual lost travel position (74).

At the forward shift point Xsf, the bottom piston reverses direction at the same time that the top piston has reached the rear shift point Xsr, and commences forward travel. The bottom piston moves rearward in the bottom chamber with the auger feeding material into the bottom chamber at the auger speed A2 adjusted from the last stroke (68 or 69). The top piston moves forward at a speed adjusted according its previous forward stroke. The pressure in the top chamber is monitored. When the pressure P reaches half of the maximum pressure reached in the top chamber during the previous forward stroke of the top piston, the computer records this as the actual lost travel position, Xla1.

At the end of the top piston stroke, the computer reads the actual lost travel and the actual piston speed (FIG. 5C) (76) and repeats the procedures described above with respect to the bottom piston stroke. The computer queries whether actual lost travel was greater than target lost travel (78) and incrementally increases (80) or decreases (81) auger speed A1 for the next forward stroke of the top piston accordingly. With the lost travel differential value (Xlt1–Xla1), the computer calculates the weight Wa1 of material pumped that stroke (82). The piston also makes the piston speed comparison (83) and incrementally adjusts piston speed accordingly (84, 85).

The computer calculates the actual total material weight Wa pumped for the pump cycle by combining the weight pumped during the forward stroke of the bottom piston Wa2 with the weight pumped during the forward stroke of the top piston Wa1 (87). The computer accumulates the Wa values to reach a total weight of material pumped. The weight can be recorded and reported in any usual and preferred fashion.

At the end of the cycle, the computer looks for a stop signal (88). Finding none, it loops (90). Otherwise it terminates (91).

What is claimed is:

1. A sludge pump system having means for determining an accurate estimate of actual pump output, comprising;
   a pump cylinder having a pump chamber;
   a piston movable in the pump chamber between a forward shift point and a rear shift point;
   power means for moving the piston through a pumping cycle in a direction from the rear shift point toward the forward shift point on a discharge stroke, and in a direction from the forward shift point toward the rear shift point on a fill stroke;
   an inlet valve to the pump chamber;
   an outlet valve from the pump chamber;
   a sludge receptacle for storing sludge preparatory to introduction of the sludge into the pump chamber through the inlet valve;
   a feed mechanism to feed sludge from the sludge receptacle through the inlet valve to the pump chamber on the fill stroke of the piston;
   means for storing a pump performance calibration, said calibration including a calibrated sludge output value for a calibration pumping cycle, and a calibrated lost travel piston position value defined as a location of the piston in the pump chamber when the pressure in the pump chamber reaches a reference pressure value during a discharge stroke;
   means for sensing the pressure in the pump chamber and determining the actual lost travel piston position value during an actual pumping cycle;
   means for determining an estimated actual pump output for a pumping cycle by making an adjustment to the calibrated output value according to the difference between the calibrated lost travel piston position value and the actual lost travel piston position value; and
   means for reporting the estimated actual output value.

2. The sludge pump system of claim 1 including:
   a variable speed control for the feed mechanism to control the rate at which sludge is introduced into the pump chamber upon the fill stroke of the piston.

3. The sludge pump system of claim 2 including:
   means for inputting a target lost travel piston position value;
   means for comparing the actual lost travel piston position with the target lost travel piston position; and
   means for adjusting the speed of the feed mechanism responsive to the difference between the target lost travel piston position and the actual lost travel piston position.

4. The sludge pump system of claim 3 wherein:
   said feed mechanism is an auger assembly.

5. The sludge pump system of claim 1 wherein;
   said calibration including a calibrated sludge output value for a calibration pumping cycle, and a calibrated lost travel piston position value defined as a location of the piston in the pump chamber when the pressure in the pump chamber reaches a pressure value in terms of a reference percentage of the maximum pressure in the cylinder reached during the previous discharge stroke of a calibration pumping cycle;
   said means for sensing the pressure in the pump chamber and determining the actual lost travel piston position value during an actual pumping cycle including means for sensing the pressure in the pump chamber and determining the actual lost travel piston position of the piston location when the pressure in the cylinder has a value in terms of said reference percentage of the maximum pressure reached in the chamber during the previous discharge stroke.

6. The sludge pump system of claim 5 wherein:
   said feed mechanism is an auger assembly.

7. The sludge pump system of claim 5 wherein:
said reference percentage is between 30% and 70%.

8. The sludge pump system of claim 5 wherein:
said reference percentage is approximately 50%.

9. The sludge pump system of claim 5 including:
means for inputting a target lost travel piston position value;
means for comparing the actual lost travel piston position with the target lost travel piston position; and
means for adjusting the speed of the feed mechanism responsive to the difference between the target lost travel piston position and the actual lost travel piston position.

10. The sludge pump system of claim 9 wherein:
said feed mechanism is an auger assembly.

11. The sludge pump system of claim 9 wherein:
said reference percentage is between 30% and 70%.

12. The sludge pump system of claim 9 wherein:
said reference percentage is approximately 50%.

13. A sludge pump system having means for determining an accurate estimate of actual pump output, comprising;
a first pumping cylinder having a first pump chamber;
a first piston movable in the pump chamber between a forward shift point and a rear shift point;
power means for moving the piston through a pumping cycle in a direction from the rear shift point toward the forward shift point on a discharge stroke, and in a direction from the forward shift point toward the rear shift point on a fill stroke;
a first inlet valve to the pump chamber;
a first outlet valve from the pump chamber;
a sludge receptacle for storing sludge preparatory to introduction of the sludge into the pump chamber through the inlet valve;
a feed mechanism with a variable speed control to feed sludge from the sludge receptacle through the inlet valve to the pump chamber on the fill stroke of the piston;
a processor having memory storing a pump performance calibration, said calibration including a calibrated sludge output value for a calibration pumping cycle, and a calibrated lost travel piston position value defined as a location of the piston in the pump chamber when the pressure in the pump chamber reaches a preselected pressure value during a discharge stroke in terms of a reference percentage of the maximum pressure reached in the pump chamber during a previous calibration discharge stroke;
means for sensing the pressure in the pump chamber and determining the actual lost travel piston position value during an actual pumping cycle discharge stroke in terms of said reference percentage of the maximum pressure reached during a just previous stroke;
means for determining an estimated actual pump output for a pumping cycle by making an adjustment to the calibrated output value according to the difference between the calibrated lost travel piston position value and the actual lost travel piston position value; and
means for reporting the estimated actual output value.

14. The sludge pump system of claim 13 including:
means for input of a target lost travel piston position value;
means for sensing a difference between the target lost travel piston position value and the actual lost travel piston position value and adjusting the speed of the feed mechanism according to said difference so that the actual lost travel value will tend to move toward the target lost travel value; and
means for adjusting the estimated actual output of the pump based upon the difference between the calibrated lost travel value and the target lost travel value, and the difference between the target lost travel value and the actual lost travel value.

15. The sludge pump system of claim 14 wherein:
said inlet valve and outlet valve are ball and cage valves.

16. The sludge pump system of claim 14 including:
a second pump cylinder with a second pump chamber;
a second pump piston movable in the second pump chamber; and
second inlet and outlet valves to and from the pump chamber.

17. The sludge pump system of claim 16 wherein:
said inlet and outlet valves are ball and cage valves.

18. The sludge pump system of claim 14 wherein:
said feed mechanism is an auger assembly.

19. A method of accurately estimating the output of a cylinder-piston variety sludge pump having a pump chamber with a pump chamber axis and a piston in the pump chamber of a pump cylinder with power means to move the piston in a direction from a rear shift point in the chamber toward a forward shift point on a discharge stroke of the piston, and in a direction from a forward shift point toward a rear shift point on a fill stroke of the piston, by performing a calibration of the pump to derive a calibrated weight output achieved with one or more selected calibration parameters and comparing the calibration parameters with corresponding run parameters to accurately estimate pump output during a pump run, comprising the steps of:
a. selecting as a pressure reference point along the axis of the pump chamber, the location where the pressure in the chamber during a discharge stroke is a selected percentage of the maximum pressure reached in the chamber during a previous discharge stroke of the piston;
b. calibrating the pump by weighing pump output for calibration cycles of the pump and determining the location of the reference pressure point;
c. estimating actual pump output by determining the difference between the piston location during an actual pump cycle and the piston location during the calibration pump cycle at the pressure reference point and using that difference to make an adjustment to the calibrated pump output.

20. A method of accurately estimating the output of a cylinder-piston variety sludge pump having a pump chamber with a pump chamber axis and a piston in the pump chamber of a pump cylinder with power means to move the piston in a direction from a rear shift point in the chamber toward a forward shift point on a discharge stroke of the piston, and in a direction from a forward shift point toward a rear shift point on a fill stroke of the piston, comprising:
performing a calibration of the pump and deriving a calibrated weight output achieved with one or more selected calibration parameters and comparing the calibration parameters with corresponding run parameters to accurately estimate pump output during a pump run, wherein one of the parameters is the location of the piston on a discharge stroke along the axis of the pump chamber when the pressure in the cylinder reaches a reference pressure point that is a selected percentage of the maximum pressure reached during a previous discharge stroke of the pump.

21. A method of accurately estimating the output of a cylinder-piston variety sludge pump having a pump chamber with a pump chamber axis and a piston in the pump chamber of a pump cylinder with power means to move the piston in a direction from a rear shift point in the chamber toward a forward shift point on a discharge stroke of the piston, and in a direction from a forward shift point toward a rear shift point on a fill stroke of the piston, and wherein the pump derives sludge from a sludge receptacle by way of a variable speed feed mechanism, and comprising:

performing a calibration of the pump and deriving a calibrated weight output achieved with one or more selected calibration parameters and comparing the calibration parameters with corresponding run parameters to accurately estimate pump output during a pump run, wherein one of the parameters is the location of the piston on a discharge stroke along the axis of the pump chamber when the pressure in the cylinder reaches a reference pressure point that is a selected percentage of the maximum pressure reached during a previous discharge stroke of the pump;

regulating the pump output by providing a target piston location in the cylinder at the point where the pressure in the cylinder reaches the reference pressure point;

adjusting the speed of the sludge feed mechanism according to the difference between the target piston location and the actual piston location at the reference pressure point for the just previous discharge stroke; and using the difference between the target piston location and the actual piston location in the calculation of actual pump output.

\* \* \* \* \*